May 21, 1940.   E. A. MILLER   2,201,372
PIPE COUPLING
Filed Nov. 26, 1938   3 Sheets-Sheet 1
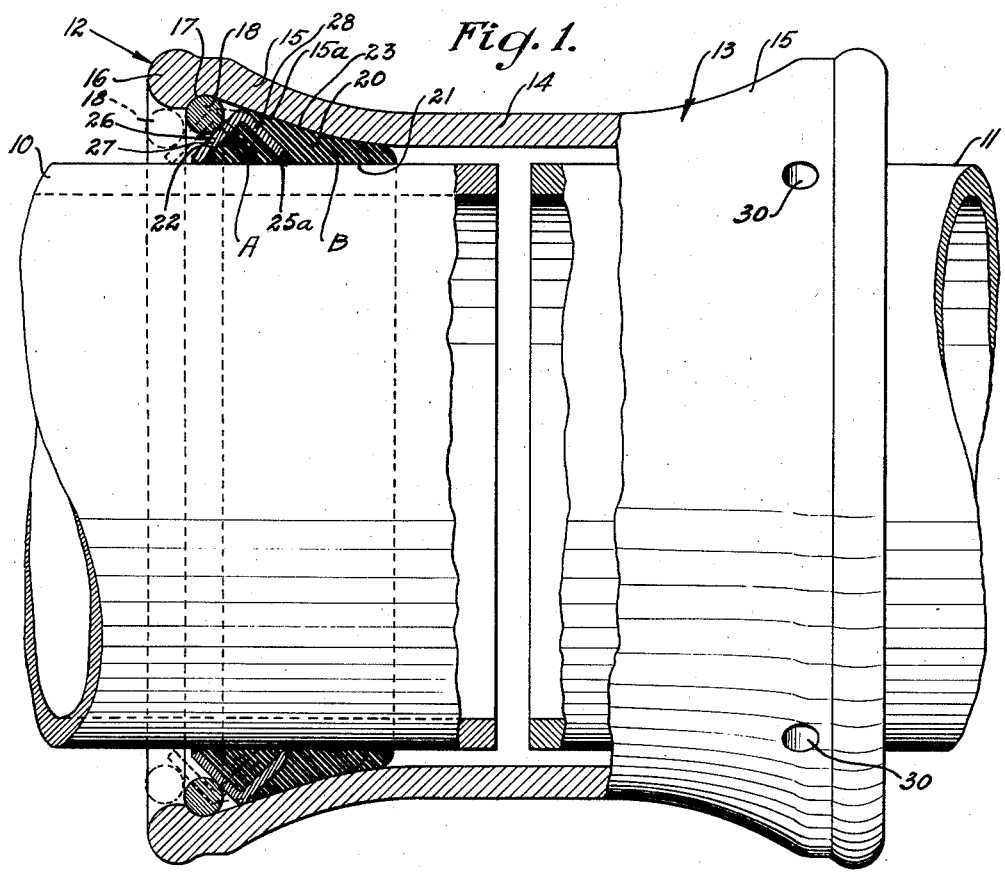
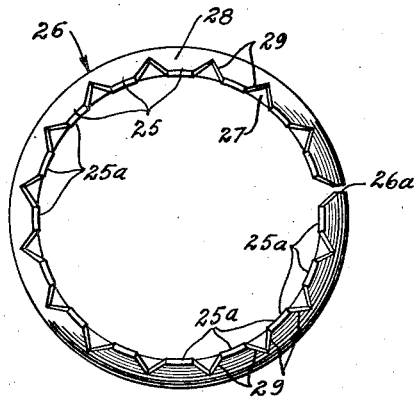
Fig. 2.
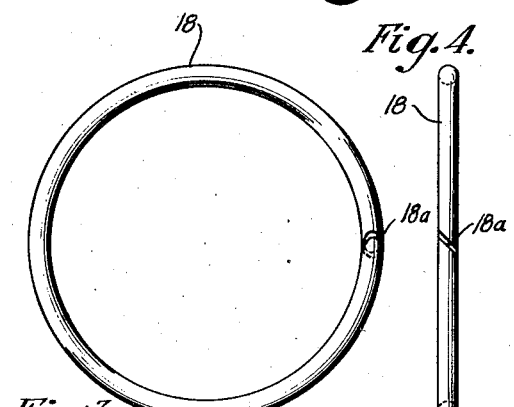
Fig. 3.
Inventor.
Eli A. Miller.
Attorney.

Fig.5.
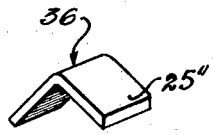
Fig.6.
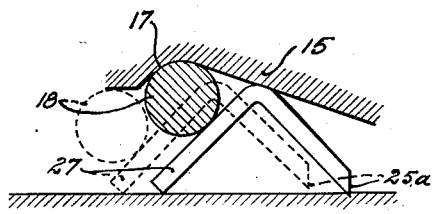
Fig.11.
Fig.8.
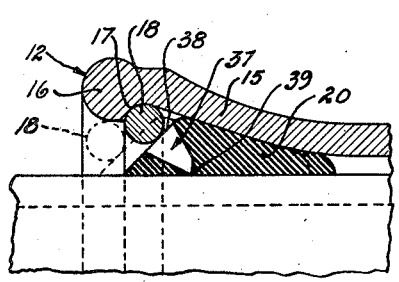
Fig.7.
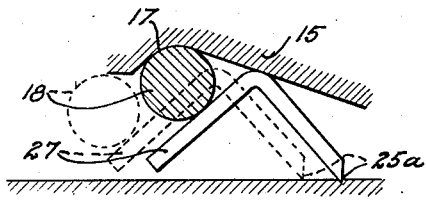
Fig.12.
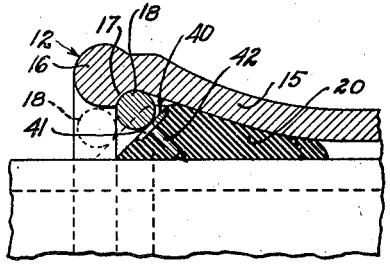
Fig.9.
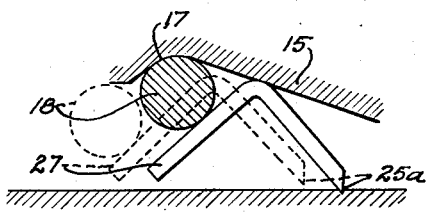
Fig.13.
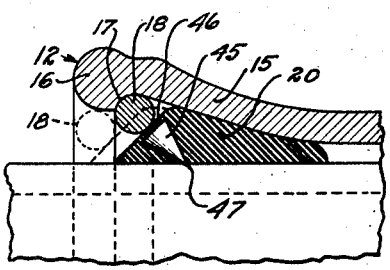
Fig.10.
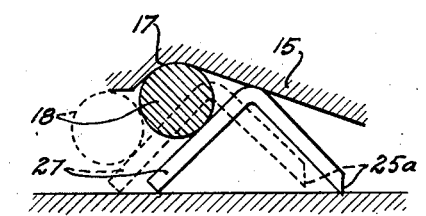
Fig.14.
Inventor.
Eli A. Miller.
Attorney.

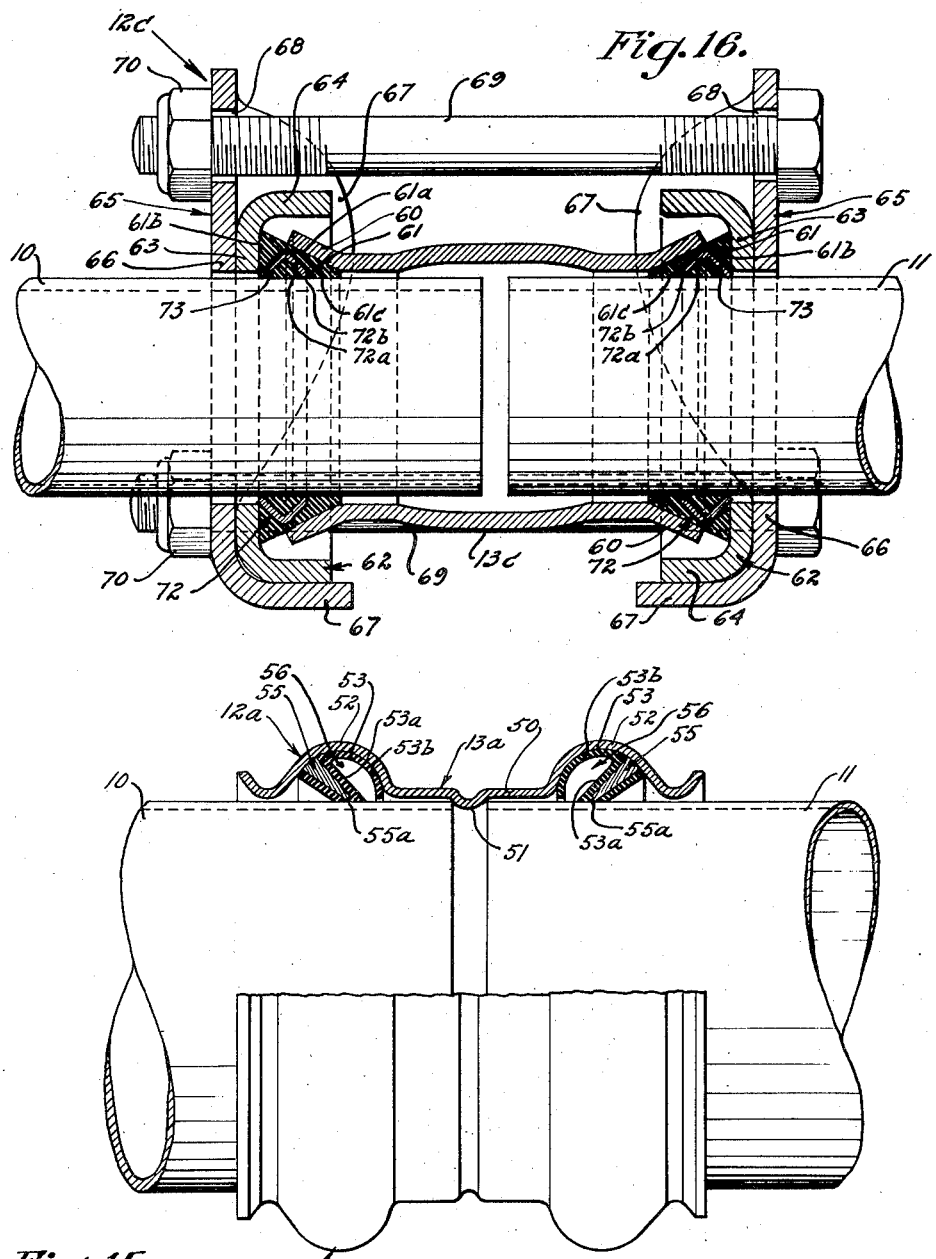

Patented May 21, 1940

2,201,372

UNITED STATES PATENT OFFICE 2,201,372

PIPE COUPLING

Eli A. Miller, Downey, Calif., assignor to Vernon Tool Co., Ltd., Los Angeles, Calif., a corporation of California Application November 26, 1938, Serial No. 242,479

4 Claims. (Cl. 285—115)

This invention relates generally to pipe couplings, and more particularly to couplings which require no thread or any other formation on the pipe.

Couplings of the type with which the present invention is concerned usually comprise a tubular body or sleeve adapted to receive the end of a pipe, a packing ring or gasket between the coupling sleeve and the pipe, and means associated with the sleeve for compressing the gasket to secure a fluid tight seal. It may be regarded as the primary purpose of the present invention to provide such a coupling with pipe gripping means adapted to act, after the coupling has been made, more positively to prevent longitudinal separative movement of the pipe from the coupling sleeve.

The present invention provides a plurality of pipe gripping elements, which are urged into biting engagement with the pipe when the coupling is made up, and which thereafter resist longitudinal separative movement of the pipe. These pipe gripping or biting elements are, in a preferred form of the invention, pressed into biting engagement with the pipe by the same means that compresses the gasket between the pipe and the sleeve. Preferably the gripping elements are embedded in the packing or gasket ring, and are caused to bite into the pipe when the gasket is compressed as the coupling is made up.

The invention will be best understood by referring now to the following detailed description of various typical embodiments thereof, reference being directed to the accompanying drawings, in which:

Fig. 1 is a view, partly in section, showing a coupling in accordance with the present invention;

Fig. 2 is a detail elevation showing a circular series of pipe gripping elements, which in this instance are joined to form an integral ring;

Figs. 3 and 4 are detail views showing a split clamping or holding ring;

Fig. 5 is a detail perspective showing an individual pipe gripping member, which may be regarded as the equivalent of a segment of the complete ring of Fig. 2;

Fig. 6 is a modification of the gripping member of Fig. 5;

Fig. 7 is a view similar to a portion of Fig. 1, but showing a modified type of pipe gripping member;

Fig. 8 is a detail perspective of a pipe gripping member such as used in the form of Fig. 7;

Fig. 9 is a view similar to Fig. 7 showing another modified form of pipe gripping member;

Fig. 10 is a view similar to Fig. 7 but showing still another form of pipe gripping member;

Figs. 11 to 14 are diagrammatic views showing the action of several different designs of pipe gripping members, all of the general type of Figs. 1 and 2, 5 or 6, as they are pressed into biting engagement with the pipe;

Fig. 15 is a view partly in section and partly in elevation showing a further modified form of the invention, in which the gasket is relied on as a sealing means but not as a means for holding the pipe ends within the coupling body; and Fig. 16 is a sectional view showing a still further modified form of the invention, in which a modified type of clamping means is employed.

In the drawings, numerals 10 and 11 indicate the two ends of a pair of unthreaded pipes, and numeral 12 designates generally a coupling embodying the present invention. This coupling typically comprises a tubular or hollow body or sleeve 13 having a central cylindrical portion 14, of somewhat greater inside diameter than the diameter of pipe ends 10 and 11, merging with outwardly flared end portions 15, each of the latter terminating in a somewhat inwardly projecting bead 16, between the inner periphery of which and the inside surface 15a of the flared end portion of the sleeve is formed an annular recess or seating surface 17 for a split clamping or holding ring 18.

A packing ring or gasket 20 surrounds pipe 10 inside flared end portion 15. This gasket 20 has an inside cylindrical surface 21 adapted to embrace the pipe, an outer end here shown as defined by an angular surface 22 formed, typically, at approximately 45° to the pipe, and an outside inclined surface 23 conforming to the inclination of flared sleeve portion 16. This gasket is preferably made of some suitable soft, yielding, or resilient material, such for instance as rubber, which is adapted to effect a fluid-tight seal with sleeve surface 15a and with the pipe when pressure is exerted against its outer end surface 22. However any suitable gasket material may be substituted, the resiliency of rubber not being essential.

In the illustrative embodiment of Figs. 1 and 2, the pipe gripping or biting elements, indicated by numeral 25 (see Fig. 2), are embedded in gasket 20, which is preferably molded about the gripping elements, and are joined to form an integral ring generally designated by numeral 26. In a later described form of the invention, this ring is segmented into a circular series of individual gripping members (see Fig. 5). When the gripping elements are integrally joined to form a ring, as in Fig. 2, the ring is preferably split, as indicated at 26a, in order to permit it to be easily contracted and biting edges 25a forced into the surface of the pipe. Ring 26 is provided with a frusto-conical shield portion 27 adapted to engage the angular end surface of gasket 20, and with a frusto-conical portion 28 extending from the outer edge of portion 27 inwardly towards the pipe at substantially 45° thereto. This portion 28 is preferably serrated, typically as illustrated in Fig. 2, to form the aforementioned angular pipe gripping elements 25. As illustratively shown in Figs. 1 and 2, elements 25 are formed with sharp biting edges 25a adapted to engage and bite into the surface of the pipe, and are tapered, as indicated at 29, so that the material of the gasket may fill in the spaces between adjacent gripping elements, it being evident that the portions of the gasket forwardly and to the rear of the gripping elements are joined only by material which fills in between the edges of the gripping elements. The fact that the portion 28 is not imperforate or solid makes it possible, as is preferable, to make the parts of the gasket forward and rearward of part 28 in one integrated piece. Neither the part A nor the part B, considered alone, is necessary to the making of a joint with the pipe; but the use of both is preferable.

Means are provided in association with body or sleeve 13 for compressing gasket ring 20 and moving pipe gripping elements 25 into biting engagement with the pipe. Preferably, and as here illustratively shown, this compressing and holding means comprises the aforementioned split ring 18. In making up the coupling, first holding ring 18, and then gasket ring 20, with the embedded pipe gripping elements, are slipped on over the end of the pipe, and coupling sleeve 13 is then moved on over and into engagement with the gasket. Holding ring 18, split, preferably diagonally, at 18a, is then compressed sufficiently to pass inside bead 16 and is placed against shield ring 27. It is preferably resiliently expansive. The diagonal split in ring 18 permits the two ends of the ring to slide past one another somewhat as the ring is compressed. At this time the parts are all in the position indicated in dotted lines in Fig. 1. Ring 18 is then driven to the expanded position illustrated in full lines, seated against seating surface 17. In driving ring 18 to clamping position, it is usually most convenient to insert one of its ends first against the gasket, and then to work the ring into place progressively along its length until the other end is in place. In so moving onto seat 17, ring 18 advances against shield ring 27, and moves the latter and resilient gasket 20 inwardly, or toward the right as viewed in Fig. 1, as from the dotted line position to the position illustrated in full lines, gasket 20 being thereby compressed and wedged forwardly between coupling sleeve surface 15a and the pipe, so as to effect a fluid-tight seal and a holding grip between said members. At the same time, split ring 26 is contracted somewhat by the pressure of ring 18 acting on its angular shield portion 27, and biting edges 25a of gripping elements 25 are forced into biting engagement with the pipe. This compressive, biting, action of ring 28 may be caused either by the fact that ring 18 exerts its pressure diagonally inwardly on ring 28, or by the fact that the outer circumference of ring 28 engages the converging surface 23 as the ring moves longitudinally and is cammed inwardly thereby (Fig. 1), or by both said actions, As will become evident, various of the later described forms of the invention may be so designed that the pipe biting elements engage and are cammed inwardly to bite into the pipe by this surface 23. The normal diameter of split holding ring 18 is preferably at least as great as its expanded diameter as illustrated in full lines in Fig. 1, so that the normal tendency of said ring is to retain its locking position. Seating surface 17 is also so formed and positioned that when ring 18 is seated thereon there is no tendency for the ring to be ejected by pressure exerted by the compressed gasket. It may here be mentioned that while the shape or angle of seat 17 is such that ring 18 will not be ejected by the thrust exerted against the ring by the compressed gasket, this seat should also be of such shape that the ring will not recede from the gasket and from the biting elements as it goes onto the seat, such as would relieve the pressure on the biting elements and loosen their grip on the pipe. A depressed or "pocketed" seat such as illustrated in Fig. 1 is suitable, and if the ring is worked progressively along its length into seating position, as described heretofore, there will be no substantial release of pressure by the ring on the biting or gripping elements as the ring goes finally into its seat. Seat 17, may, however, be formed either parallel to gripper element portions 25 (see Figs. 11 to 14) or at any other angle which will permit the ring to seat without release of pressure on the gripper elements and still assure that the ring will not be ejected by the thrust exerted by the compressed gasket.

When it is desired to remove ring 18 to uncouple the pipe, it may be driven out by using a suitable driving tool placed against it through ejector holes 30 formed in the sleeve back of bead 16.

Pipe gripping elements 25 are thus forced to bite substantially into the pipe. It will be observed that the holding pressure is transferred from ring 18 through shield ring 27 to gripping elements 25, and that the latter extend angularly toward the pipe, in a direction against or opposite to the direction of longitudinal separative movement of the pipe. Any tendency for such longitudinal separative movement of the pipe is accordingly resisted by the angularly disposed elements 25 which have bitten substantially into the surface of the pipe, and unless holding ring 18 is first manually ejected, the pipe cannot become separated from the coupling sleeve.

Attention is now directed to Figs. 11 to 14 illustrating diagrammatically the action of the pipe gripping elements in moving into biting engagement with the pipe for several different design conditions. In Figs. 11 to 14 positions of the pipe gripping members prior to and after driving holding ring 18 onto its seat are illustrated in dotted lines and in full lines respectively.

Fig. 11 illustrates the condition in which the inner edge of holding ring 27 and also biting edge 25a of gripping elements 25 are initially in engagement with the surface of the pipe, as in Fig. 1. In this instance, the motion of the gripping members in moving from the dotted line to the full line position is principally translation along the pipe, with a slight tilting action as biting edge 25a is forced into the surface of the pipe.

In Fig. 12, a variational design is indicated, in which biting edges 25a are initially in engagement with the pipe, but in which shield ring 27 remains at all times out of engagement with the pipe. In this instance, the gripping elements are moved along the pipe and inwardly toward it as edges 25a take their bite.

In Fig. 13, biting edges 25a are initially slightly separated from the pipe, while shield ring 27 remains at all times out of engagement with the pipe. In this instance, the gripping members are simultaneously advanced along and moved inwardly toward the pipe, perhaps tilting slightly as edges 25a bite into the pipe.

In the instance of Fig. 14, the design is such that the inner edge of shield ring 27 is initially in engagement with the pipe, but biting edges 25a are initially slightly separated from the pipe. The action in this instance is in general similar to that of Fig. 11, but with the gripping members tilting somewhat more as they are moved to biting position.

It has previously been mentioned that ring 26 may be segmented. Fig. 5 shows an individual gripping element 35 which may be regarded as a segment of the complete integral ring 26 illustrated in Fig. 2. This member 35 is provided with a shield portion 27' which may be regarded as a segment of shield ring 27 of Fig. 2, and with an angular gripping element 25' like corresponding gripping elements 25 of Fig. 2. These individual members 35 will be understood to be embedded in resilient gasket 20 in a circular series, shield portions or lugs 27' being placed either substantially edge-to-edge, or, if desired, with a spacing therebetween. The final structure as well as action may be regarded as the same as previously described, excepting only that ring 26 is segmented into a number of individual members 35 such as illustrated in Fig. 5.

Fig. 6 shows a modification of the individual gripping member of Fig. 5. The gripping member, indicated generally at 36, in this instance differs from that of Fig. 5 in that biting elements 25'' are provided with parallel rather than converging edges. In this instance, successive gripping members 36 will preferably be spaced somewhat from one another in gasket 20, so that the gasket material can fill in between adjacent members.

Figs. 7 and 8 show a modified form of gripping member, designated generally by numeral 37, which is in the form of a truncated pyramid. The base 38 of the pyramid is engaged by holding ring 18, while the opposite end 39 of the pyramid is formed at an angle to the base, so as to provide a sharp pipe-biting edge 39. A series of these members are placed in circular formation in the gasket.

Fig. 9 illustrates a further modification, in which the circular series of pipe gripping elements here designated by numeral 40, are in the general form of a roofing tack, the head 41 of which is engaged by holding ring 18, and the sharpened shank 42 of which extends angularly toward and bites into the surface of the pipe, as indicated.

Fig. 10 shows a further modification, illustrating that the holding means, again illustratively shown as a ring 18, need not directly engage the pipe gripping members. Thus, the series of pipe gripping members, indicated at 45, and here illustrated in the form of a cone, is entirely embedded in resilient gasket 20, its base 46 being opposed to ring 18, but being entirely covered over by the gasket material, while the cone as a whole is directed angularly toward the surface of the pipe, with its pointed end 47 forced into biting engagement with the pipe.

Fig. 15 shows a modification in which the gasket member acts to seal against pressure leakage, but is not relied on to aid in holding the pipe ends against separative movement, except insofar as it serves as a support for the gripping elements. In Fig. 15 the pipe ends are again indicated by numerals 10 and 11, the coupling in this instance being designated generally by numeral 12a. This coupling typically comprises a tubular or hollow body or sleeve 13a having an intermediate cylindrical portion 50 formed with a central inwardly disposed bead 51, adapted to be engaged by the pipe ends as illustrated, and having outwardly curved end portions 52 forming concave inwardly facing seats for gasket rings 53, which may be of any suitable yielding or resilient material, such as described in connection with the previously discussed forms of the invention.

The pipe gripping elements are designated generally at 55, and as here shown are disposed in an angular position, converging inwardly toward the pipe in directions toward the respective pipe ends, with their inner biting edges 55a in engagement with the pipe. These gripping elements may, of course, be of any of the types heretofore mentioned, or any equivalent thereof, and may comprise either an integrated ring, like in Fig. 2, or a circular series of segments. The outer portions of the gripping members are supported by curved wall portions 52, and, as here shown, engage directly against said wall portions, in the manner clearly illustrated in Fig. 15. Each gasket ring 53, as here illustratively shown, comprises an annular portion 53a encasing gripping elements 55 and extending angularly from wall portion 52 to the surface of the pipe, together with a flap portion 53b which engages wall portion 52 forwardly of portion 53a.

Prior to making up the coupling, gasket rings 53, with the gripping elements 55 embedded therein, are placed within the curved wall portions 52 of the coupling sleeve. To make up the coupling, the two pipe ends are simply inserted inside the two ends of the sleeve to the positions illustrated in the figure. The normal inside diameter of gasket portions 53a is such as snugly to fit the pipe. Pressure fluid from within the pipe line passes between sleeve portion 50 and the outer surface of the pipe to the space 56 within gasket ring 53, and acting against portion 53a of the gasket, presses said portion tightly against the pipe, while at the same time pressing flap portion 53b tightly against inner surface of sleeve wall 52, thereby effecting a pressure tight seal between the pipe and the coupling sleeve. Upon any tendency of the pipe ends to move outwardly of the coupling sleeve, the biting ends 55a of gripping elements 55 immediately bite into the surface of the pipe, thereby effectively and positively keying the pipe ends against separation from the coupling.

Fig. 16 shows a modification in which a variational type of clamping means is employed. The two pipe ends are again indicated by numerals 10 and 11, while the coupling is indicated generally by numeral 12c. This coupling embodies a tubular or hollow body or sleeve 13c, adapted to receive the two ends of the pipe, as illustrated. The end portions of sleeve 13c are each formed with an outwardly diverging or conical portion 60, and a frusto-conical gasket ring 61 is provided having a conical surface 61a adapted to engage the inner surface of conical sleeve portion 60, gasket ring 61 in this instance projecting somewhat beyond or outwardly of the end of sleeve 13c, as indicated, and its outer end 61b being disposed at right angles to the axis of the pipe. The inner surface 61c of gasket ring 61 is annular and embraces the pipe from one end of the gasket to the other, as illustrated. Gasket 61 may again be formed of a suitable yielding or resilient material, such as rubber, etc., as explained in connection with the earlier described forms of the invention.

The outer end surface 61b of gasket ring 61 is preferably, and as here shown, engaged by a shield member 62, here illustrated in the form of a ring portion 63 engaging gasket surface 61b, and an outer flange portion 64 turned forwardly so as to surround the forward end of sleeve 13c and thus protect the gasket. Pressing shield member 62 against gasket 61 is a clamp 65 comprising a plate 66 which engages ring 63. This plate 66 has perforations 68 adapted to receive clamping bolts 69, the clamp members 65 at the two ends of the coupling being drawn together to press shield members 62 against the outer ends of gaskets 61 and thereby wedge said gaskets tightly between the conical ends of sleeve 13c and the surface of the pipe, by setting up nuts 70 on the end of bolts 69. It will be understood that any suitable number of bolts may be employed. The form illustrated is designed for three equally spaced bolts. Between these bolts, plate 65 is bent around shield flange 64, as indicated at 67, in order to increase the structural strength of the assembly.

Embedded in gasket rings 61 are pipe gripping elements 72, here shown as of the form illustrated in Fig. 1. It is of course to be understood that these pipe gripping elements 72 may again comprise an integrated ring, or a circular series of individual segments, and that they may be of various forms as previously indicated in connection with the other described forms of the invention. As here illustratively shown, gripping elements 72 have angular gripping portions 72a formed with pipe biting edges 72b, and with frusto-conical portions 73, as in Figs. 1 and 2, or as in Fig. 5. The gasket ring is compressed and wedged between the conical end portion 60 of sleeve 13c and the surface of the pipe to effect a fluid-tight seal and to provide a tight grip between the gasket and the pipe by drawing up on nut 70, in the manner previously described. When the clamping device has thus been set up, gripping elements 72 are in biting engagement with the pipe, their rearward, frusto-conical base portions 73 being supported, as here typically illustrated, by shield members 62, so that separative movement of the pipe ends from the coupling is effectively prevented.

It may here be observed that in the form of Fig. 16, the holding or clamping means for compressing the gasket and for supporting the pipe gripping elements is not in direct engagement with the hollow body or coupling sleeve, as is the holding ring 18 in the form of Fig. 1; three holding parts (members 62, 65 and 69) are, however, associated with the hollow body or sleeve by being mounted through gasket rings 61 against the end portions thereof, and this form of the invention is therefore within the scope and meaning of certain of my claims which refer to "means associated with the hollow body" for compressing the gasket and/or supporting the gripping elements in biting engagement with the pipe.

The drawings show double-ended couplers such as are used to interconnect two plain-ended pipes. A single end of that coupler may of course be used to make connection with the end of a pipe in any situation. For example, the body 13 shown in Fig. 1 may be a bell or enlargement formed on or secured on to the end of a section of pipe. Such a bell or enlargement on the end of a pipe, or embodied in a pipe fitting or the like, is included within the term body, hollow body, or sleeve, as used herein and in the claims.

While I have now illustrated and described several variational forms of my invention, these are to be regarded as illustrative only and as not exhausting the possible forms in which the invention may be embodied in practice.

I claim:

1. In a pipe coupler, the combination of a hollow body adapted to receive the end of a pipe, a gasket ring between said pipe and hollow body, a plurality of pipe gripping elements embedded in said gasket ring and adapted for biting engagement with said pipe, shield means integral with said gripping elements overlying and engaging the outer end of said gasket, and means associated with said body for engaging said shield means to compress said gasket and to press said gripping elements into biting engagement with the pipe.

2. In a pipe coupler, the combination of a hollow pipe-receiving body, a gasket fitted between said pipe and said body, holding means receivable inside said body and cooperable with said body to displace said gasket longitudinally of the pipe in a direction to wedge it between the inside surface of the body and the surface of the pipe, and a plurality of pipe biting members arranged in a circular series extending around the pipe and embedded in said gasket, said members each comprising a portion extending from the holding means along a line angularly of the pipe and inwardly of the body, and a portion having a surface substantially normal to said first mentioned portion adapted to be engaged by said holding means, said pipe biting members being forced into biting engagement with the pipe when said holding means is moved to position to displace said gasket.

3. In a pipe coupler, the combination of a hollow pipe-receiving body, a gasket fitted between said pipe and said body, holding means receivable inside said body and cooperable with said body to displace said gasket longitudinally of the pipe in a direction to wedge it between the inside surface of the body and the surface of the pipe, and a split ring forming a plurality of integrally joined pipe biting members arranged in a circular series extending around the pipe and embedded in said gasket, said members each comprising a portion extending from the holding means along a line angularly of the pipe and inwardly of the body, and a portion having a surface substantially normal to said first mentioned portion adapted to be engaged by said holding means, said pipe biting members being forced into biting engagement with the pipe when said holding means is moved to position to displace said gasket.

4. In a pipe coupler, the combination of a hollow pipe-receiving body, a plurality of pipe biting members arranged in a circular series extending around the pipe inside said hollow body, and holding means receivable inside said body and cooperable with said body to hold said pipe biting members in biting engagement with the pipe, said pipe biting members each comprising a portion extending from the holding means along a line angularly of the pipe and inwardly of the body, and a portion having a surface substantially normal to said first mentioned portion adapted to be engaged by said holding means.

ELI A. MILLER.